(12) United States Patent
Wu et al.

(10) Patent No.: US 7,869,137 B2
(45) Date of Patent: Jan. 11, 2011

(54) ABBE PRISM LENS WITH IMPROVED FOCUS AND REDUCED FLAIR

(75) Inventors: Rong Yaw Wu, Hsin-Tien (TW); Yen-Chieh Chen, Hsin-Tien (TW); Shih Che Chen, Hsin-Tien (TW); Ching Yi Chen, Hsin-Tien (TW)

(73) Assignee: Pixon Technologies Corp., Taipei Hsien (TW)

( * ) Notice: Subject to any disclaimer, the term of this patent is extended or adjusted under 35 U.S.C. 154(b) by 0 days.

(21) Appl. No.: 12/467,838

(22) Filed: May 18, 2009

(65) Prior Publication Data

US 2010/0290134 A1    Nov. 18, 2010

(51) Int. Cl.
*G02B 3/02* (2006.01)
*G02B 17/00* (2006.01)
(52) U.S. Cl. .................... 359/720; 359/728
(58) Field of Classification Search ............. 359/720, 359/726–728
See application file for complete search history.

(56) References Cited

U.S. PATENT DOCUMENTS 4,173,394 A * 11/1979 Clave et al. ............... 359/726
6,215,596 B1 * 4/2001 Araki et al. ............... 359/720

* cited by examiner

*Primary Examiner*—Alicia M Harrington
(74) *Attorney, Agent, or Firm*—Muncy, Geissler, Olds & Lowe, PLLC

(57) ABSTRACT

An Abbe prism lens and lens array are disclosed. The lens comprises front lenses disposed on a front surface of the Abbe prism, rear lenses disposed on a rear surface of the Abbe prism, a front bottom reflecting surface, a rear bottom reflecting surface, a left top reflecting surface, and a right top reflecting surface. An aperture cover is positioned over the front surface of the Abbe prism lens and a field cover is positioned over the rear surface of the Abbe prism lens. The aperture cover comprises aperture holes encircling the aspherical front lenses. The field cover comprises field holes encircling the aspherical rear lenses. Light enters the Abbe prism lens and reflects off the front bottom reflecting surface, reflects off the left top reflecting surface and the right top reflecting surface, reflects off the rear bottom reflecting surface, and exits the rear lens of the Abbe prism lens.

8 Claims, 22 Drawing Sheets

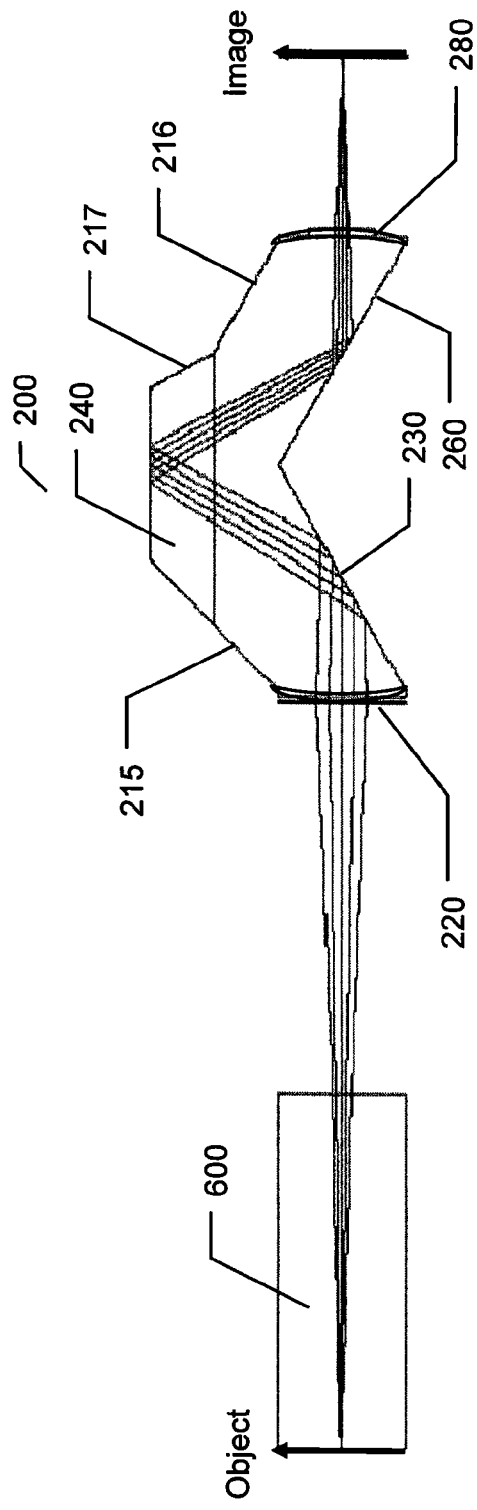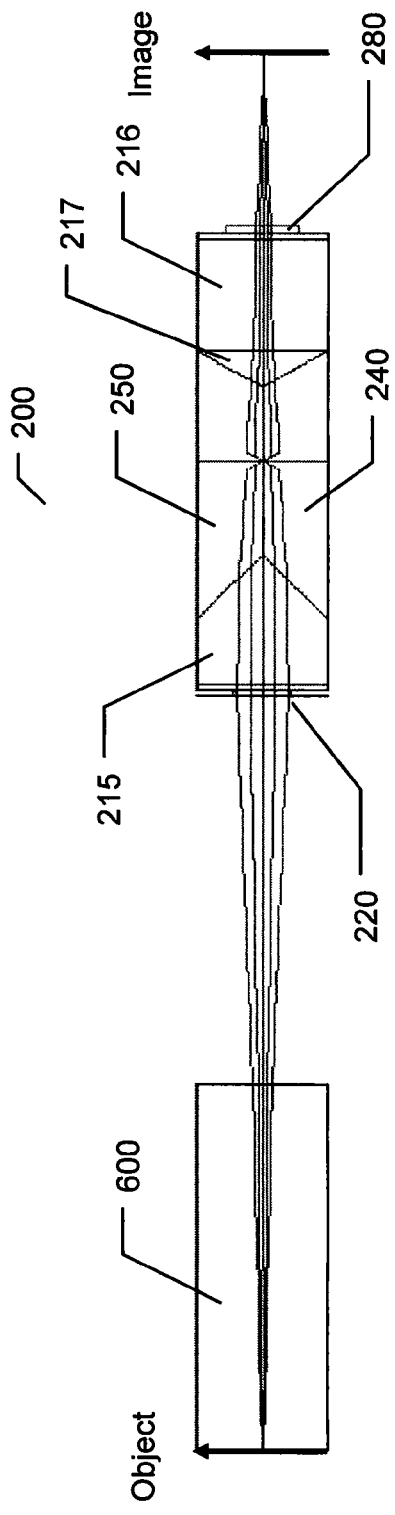
Figure 6A
Figure 6B

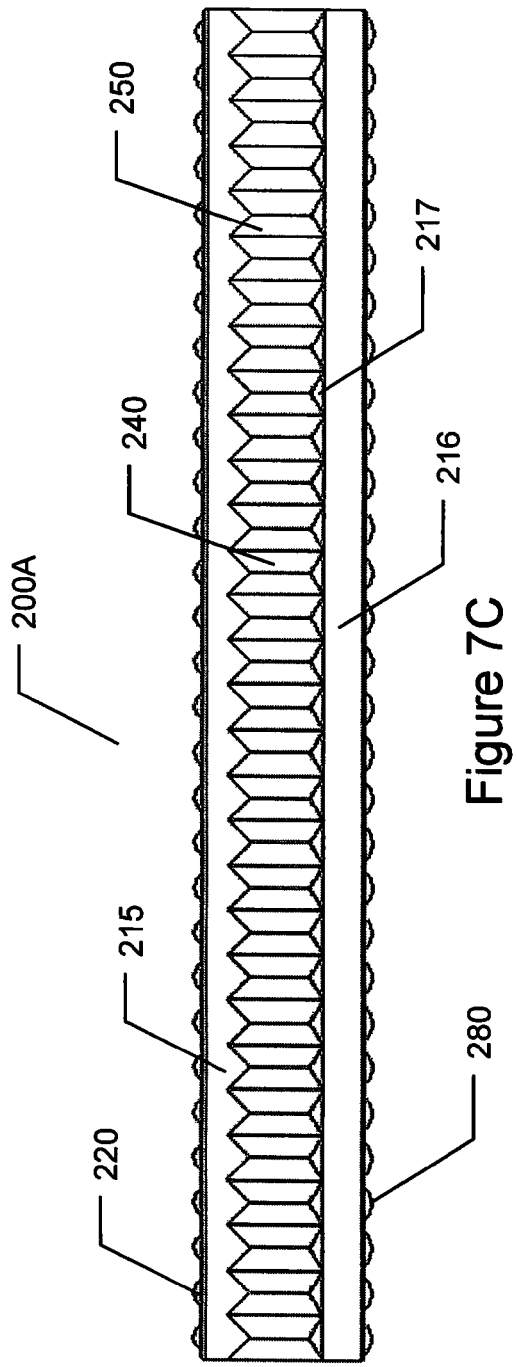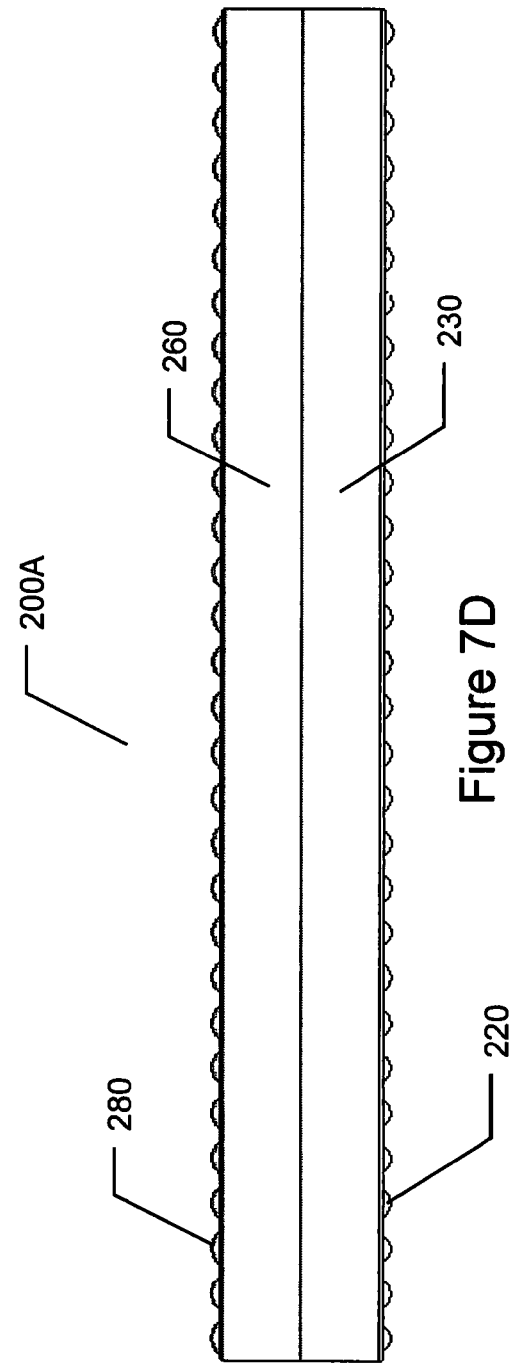

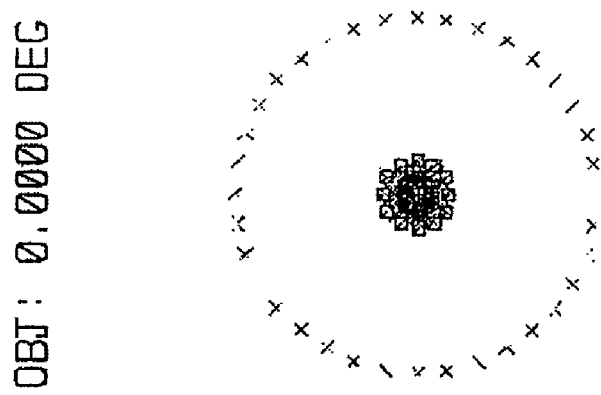
Figure 9B – Prior Art

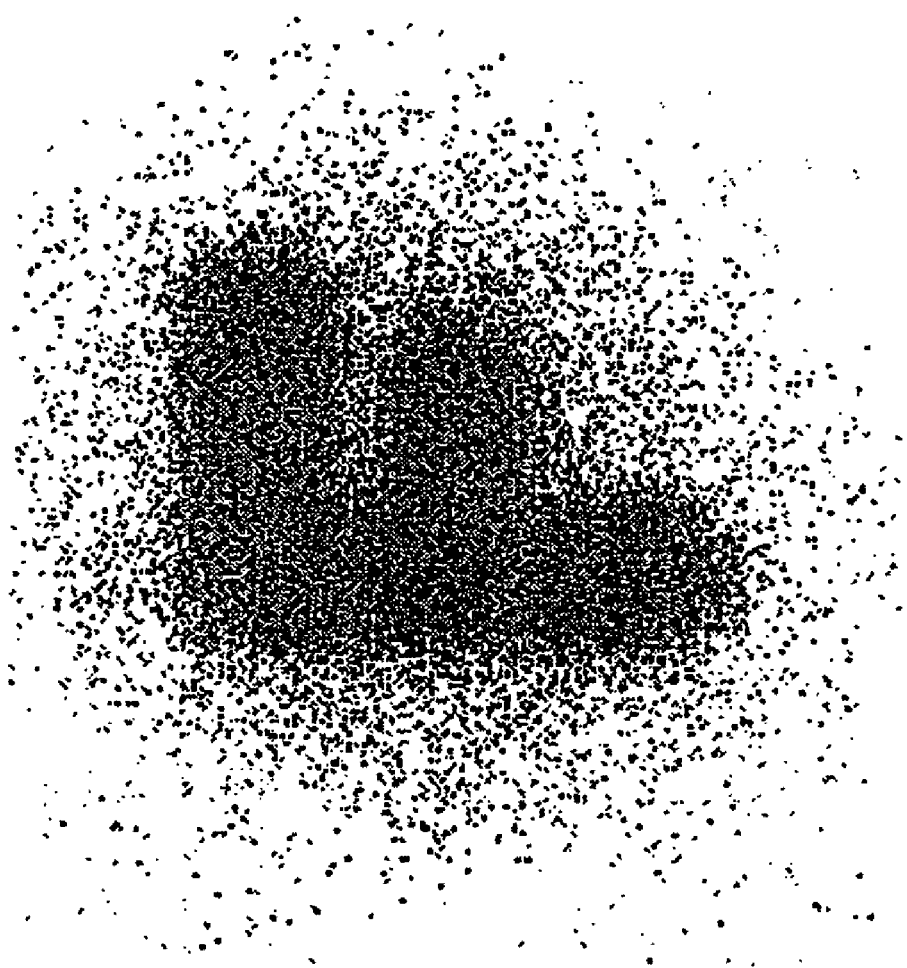
Figure 10B – Prior Art

ABBE PRISM LENS WITH IMPROVED FOCUS AND REDUCED FLAIR

BACKGROUND OF THE INVENTION

1. Field of the Invention

The present invention relates to optics. More specifically, the present invention discloses an Abbe prism lens and a lens array assembly comprising a plurality of Abbe prism lenses for high-resolution imaging of a surface.

2. Description of the Prior Art

Traditionally, the lens for a one to one imaging optical scanner is a rod lens array. Please refer to FIG. 1, a perspective drawing of a prior-art rod lens array 100. The rod lens array 100 is constructed from a plurality of fiber optic rod lenses 110. Each individual fiber optic rod lens 110 is cut from a fiber optic glass strand, and its ends must be polished. The plurality of fiber optic rod lenses 110 are then arranged side by side, in a row or multiple rows with their optical axes in parallel, in a frame 120 and held in place by an adhesive layer 130. The fiber optic rod lenses 110 are typically made from GRIN (graduated index) fibers, with the refractive index of the glass carefully controlled during manufacture to have a graduated refractive index that decreases radially from the central axis to the edge.

However, this type of lens is expensive to manufacture. GRIN type fiber optic glass strands are expensive in and of themselves; cutting and polishing the strands to precise lengths to form fiber optic rod lenses 110, assembling them so that their axes are precisely parallel in the frame 120, and gluing the fiber optic rod lenses 110 are all precision steps for which entire technologies have had to be developed in order to satisfy requirements.

In addition, a major disadvantage of this type of lens is that because of the number of lenses and the difficulty in orienting them, it is not practical to shape the ends of the lenses so that they can magnify the surface that they are imaging; flat ends are used. In order to increase the imaging resolution, it is necessary to use larger numbers of smaller-diameter rod lenses 110, limiting the maximum resolution and driving up the costs as the desired resolution increases. Furthermore, suppliers for the necessary GRIN fiber optic strands are limited, and thus the base materials themselves are expensive.

Therefore there is need for an improved lens array for which materials are substantially cheaper and which is simpler to manufacture, and which can have superior imaging properties without substantially increasing costs.

SUMMARY OF THE INVENTION

To achieve these and other advantages and in order to overcome the disadvantages of the conventional method in accordance with the purpose of the invention as embodied and broadly described herein, the present invention provides an Abbe prism lens and a lens array assembly comprising a plurality of Abbe prism lenses.

The present invention also provides a lens array where a plurality of lens faces are molded into surfaces of polymer bars, thus simplifying manufacturing, using inexpensive materials, and aligning the lenses without requiring significant manufacturing infrastructure.

The present invention further provides a lens array where the lens faces are configurable at the time of design to support increased resolution.

The Abbe prism lens of the present invention comprises an aspherical front lens disposed on a front surface of the Abbe prism, an aspherical rear lens disposed on a rear surface of the Abbe prism, a front bottom reflecting surface, a rear bottom reflecting surface, a left top reflecting surface, a right top reflecting surface, a front slope surface, and a rear slope surface comprising an upper rear slope surface and a lower rear slope surface.

The front slope surface is positioned between the left top reflecting surface and the right top reflecting surface and the front surface. The rear slope surface is positioned between the left top reflecting surface and the right top reflecting surface and the rear surface. The front bottom reflecting surface is positioned between the front surface and the rear bottom reflecting surface and the rear bottom reflecting surface is positioned between the front bottom reflecting surface and the rear surface. The left top reflecting surface and the right top reflecting surface form a roof on the Abbe prism lens.

Light is reflected off an object and enters the aspherical front lens of the Abbe prism lens. This light then reflects off the front bottom reflecting surface, reflects off the left top reflecting surface and the right top reflecting surface, reflects off the rear bottom reflecting surface, and exits the aspherical rear lens of the Abbe prism lens.

After the light reflects off the front bottom reflecting surface a portion of the light takes a path that reflects firstly off the left top reflecting surface and then secondly off the right top reflecting surface before reflecting off the rear bottom reflecting surface. The other portion of the light takes a path that reflects firstly off the right top reflecting surface and then secondly off the left top reflecting surface before reflecting off the rear bottom reflecting surface.

Light entering the Abbe prism lens of the present invention is reflected a total of four times before exiting. As a result, the corresponding image of the object is in up-right orientation and not upside-down.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings:

FIGS. 6A-6D are drawings illustrating light paths through an Abbe prism lens according to an embodiment of the present invention;

FIG. 7C is a top view drawing illustrating an Abbe prism lens array according to an embodiment of the present invention;

FIG. 7D is a bottom view drawing illustrating an Abbe prism lens array according to an embodiment of the present invention;

FIG. 9B is a drawing illustrating a lens simulation for a convention lens array of the prior art;

FIG. 10B is a drawing illustrating a lens simulation for a conventional lens array of the prior art.

DESCRIPTION OF THE PREFERRED EMBODIMENTS

Figure 1:
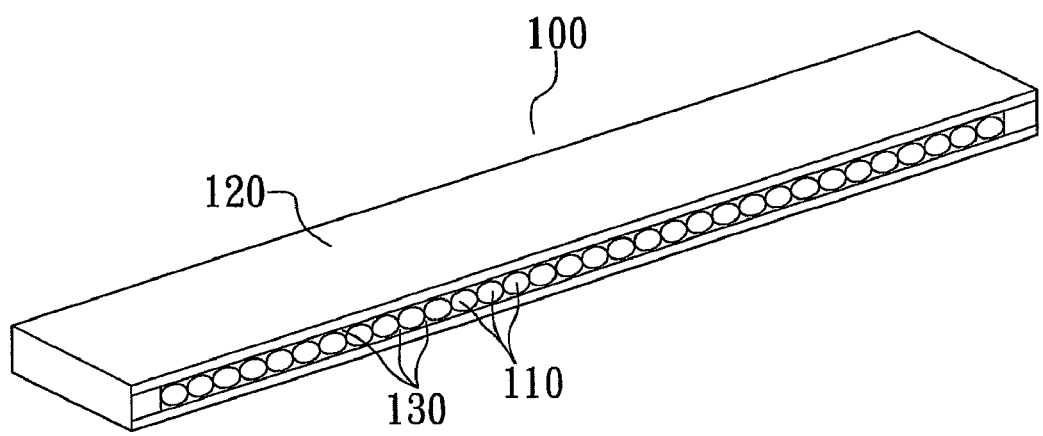
FIG. 1 is a perspective drawing of a prior art rod lens array.

Reference will now be made in detail to the preferred embodiments of the present invention, examples of which are illustrated in the accompanying drawings. Wherever possible, the same reference numbers are used in the drawings and the description to refer to the same or like parts.

Figure 2A:
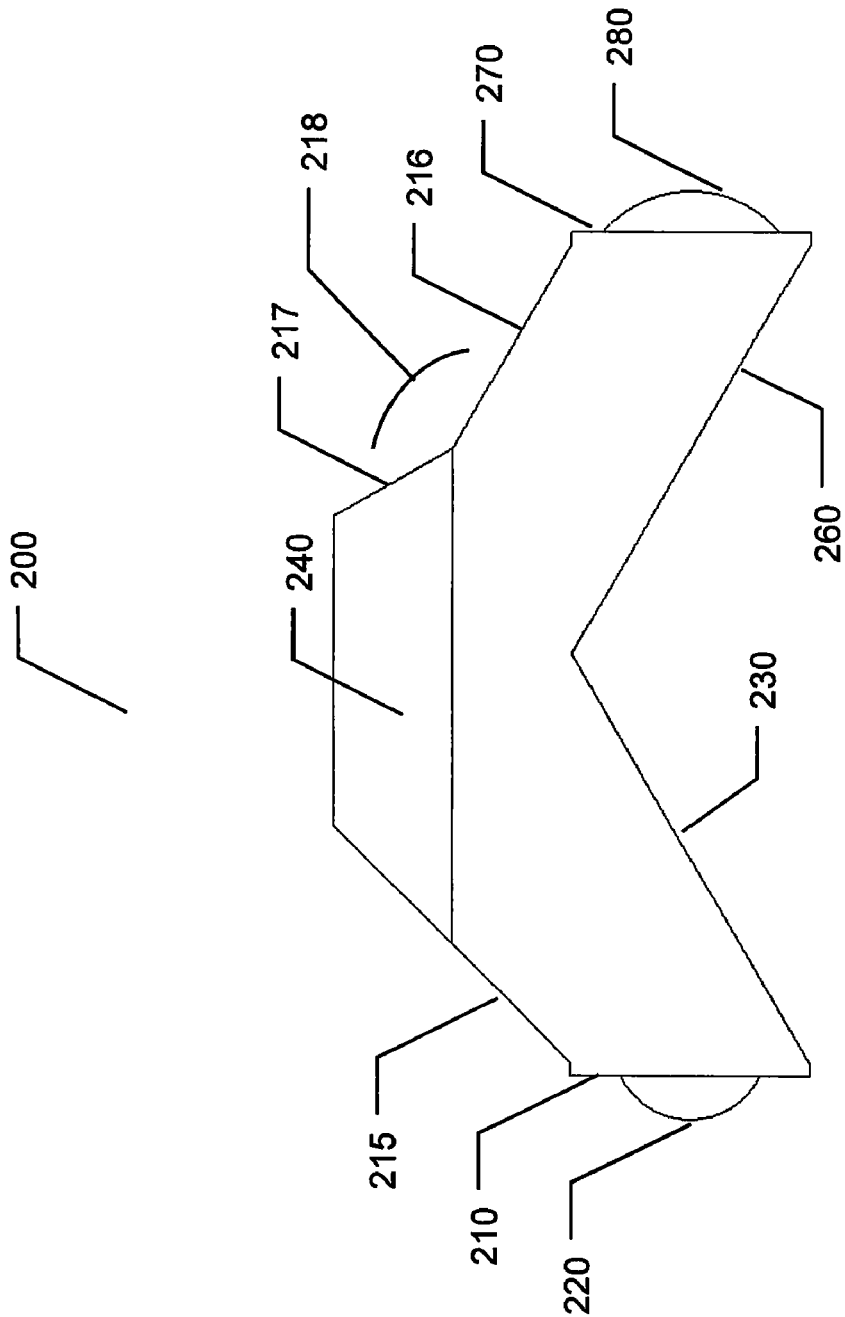
FIG. 2A is a side view drawing illustrating an Abbe prism lens according to an embodiment of the present invention.
Figure 2B:
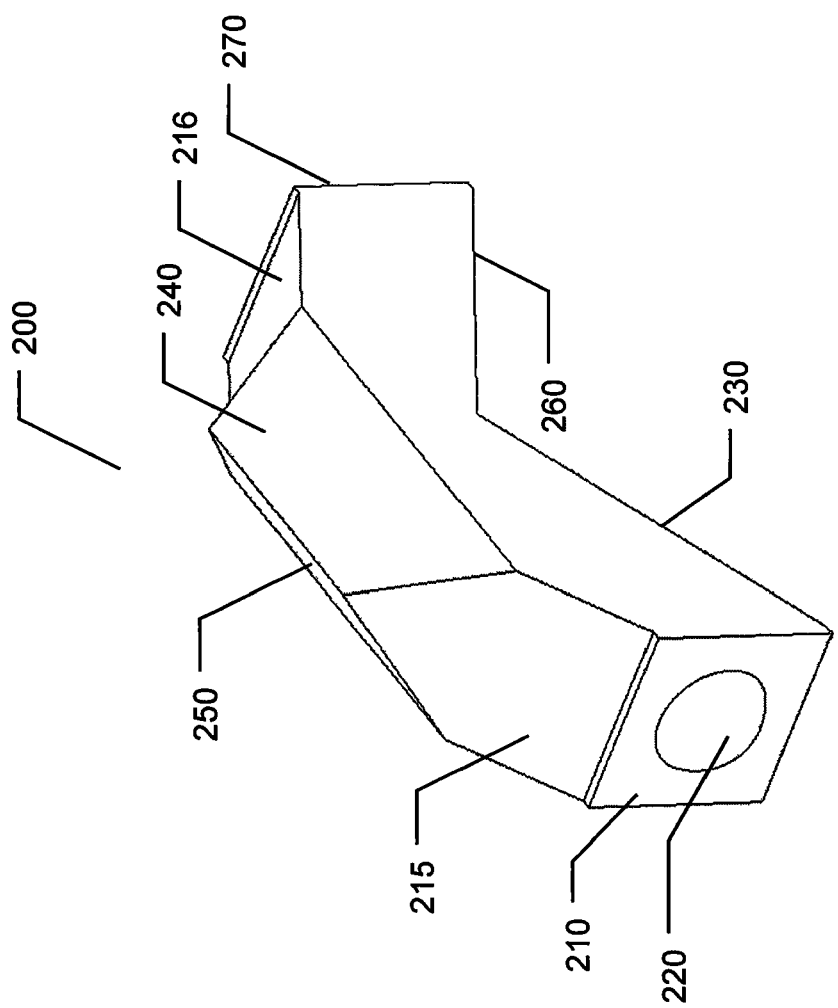
FIG. 2B is a perspective front view drawing illustrating an Abbe prism lens according to an embodiment of the present invention.
Figure 2C:
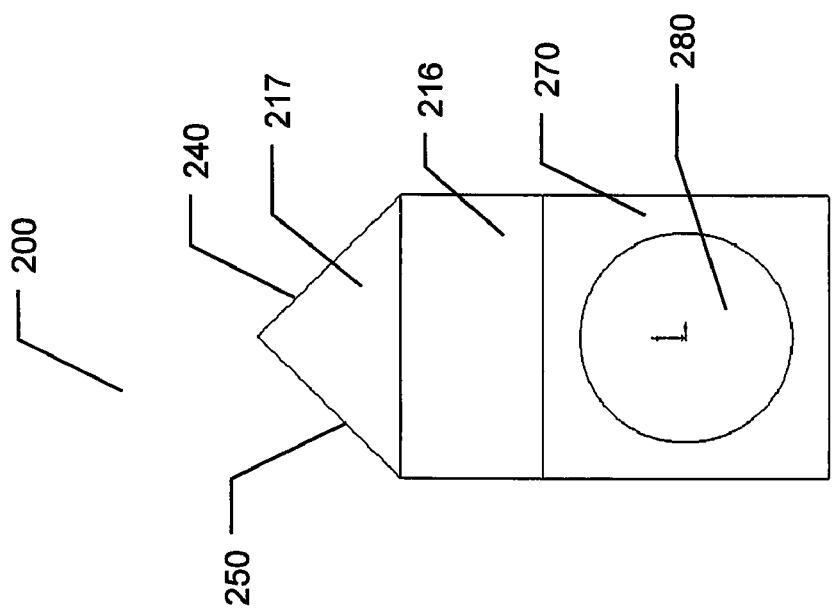
FIG. 2C is a rear view drawing illustrating an Abbe prism lens according to an embodiment of the present invention.
Figure 2D:
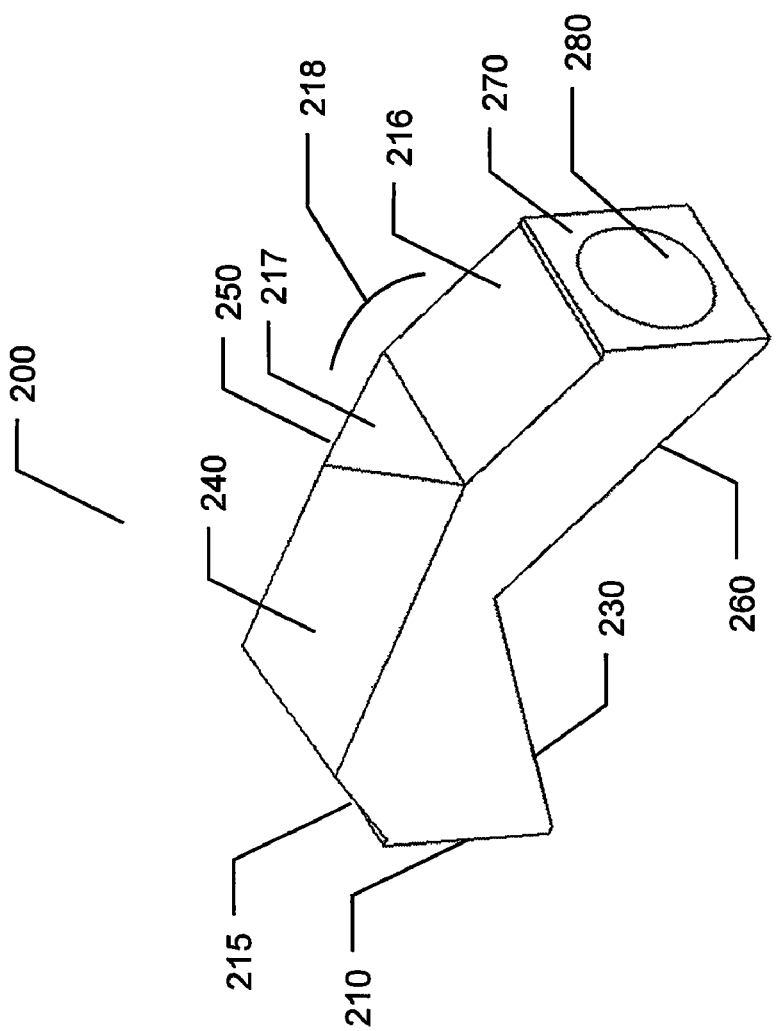
FIG. 2D is a perspective rear view drawing illustrating an Abbe prism lens according to an embodiment of the present invention.

Refer to FIG. 2A, which is a side view drawing illustrating an Abbe prism lens according to an embodiment of the present invention, to FIG. 2B, which is a perspective front view drawing illustrating an Abbe prism lens according to an embodiment of the present invention, to FIG. 2C, which is a rear view drawing illustrating an Abbe prism lens according to an embodiment of the present invention, and to FIG. 2D, which is a perspective rear view drawing illustrating an Abbe prism lens according to an embodiment of the present invention.

As shown in FIGS. 2A-2D, the Abbe prism lens 200 of the present invention comprises an aspherical front lens 220 disposed on a front surface 210 of the Abbe prism 200, an aspherical rear lens 280 disposed on a rear surface 270 of the Abbe prism 200, a front bottom reflecting surface 230, a rear bottom reflecting surface 260, a left top reflecting surface 250, a right top reflecting surface 240, a front slope surface 215, and a rear slope surface 218 comprising an upper rear slope surface 217 and a lower rear slope surface 216.

The front slope surface 215 is positioned between the left top reflecting surface 250 and the right top reflecting surface 240 and the front surface 210. The rear slope surface 218 is positioned between the left top reflecting surface 250 and the right top reflecting surface 240 and the rear surface 270. The front bottom reflecting surface 230 is positioned between the front surface 210 and the rear bottom reflecting surface 260 and the rear bottom reflecting surface 260 is positioned between the front bottom reflecting surface 230 and the rear surface 270.

The left top reflecting surface 250 and the right top reflecting surface 240 form a roof on the Abbe prism lens 200.

Figure 3A:
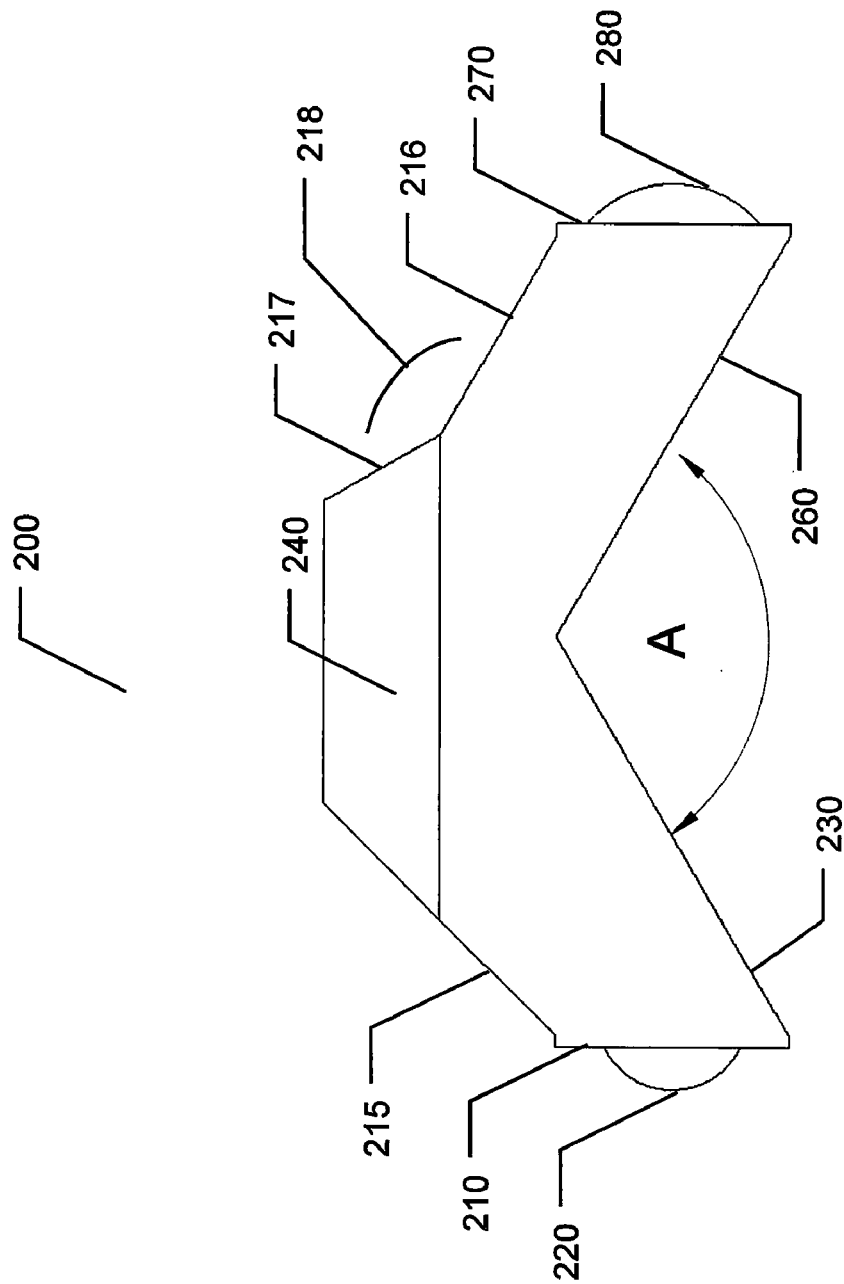
FIG. 3A is a side view drawing illustrating an Abbe prism lens according to an embodiment of the present invention.
Figure 3B:
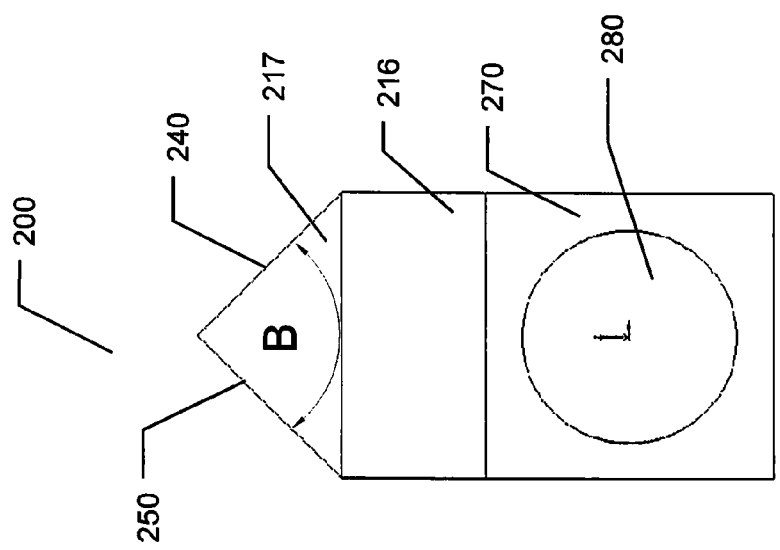
FIG. 3B is a rear view drawing illustrating an Abbe prism lens according to an embodiment of the present invention.

Refer to FIG. 3A, which is a side view drawing illustrating an Abbe prism lens according to an embodiment of the present invention and to FIG. 3B, which is a rear view drawing illustrating an Abbe prism lens according to an embodiment of the present invention.

As shown in FIG. 3A, the angle range between the front bottom reflecting surface 230 and the rear bottom reflecting surface 260 is between 1 and 179 degrees.

As shown in FIG. 3B, the angle range between the left top reflecting surface 250 and the right top reflecting surface 240 is between 1 and 90 degrees.

Figure 4:
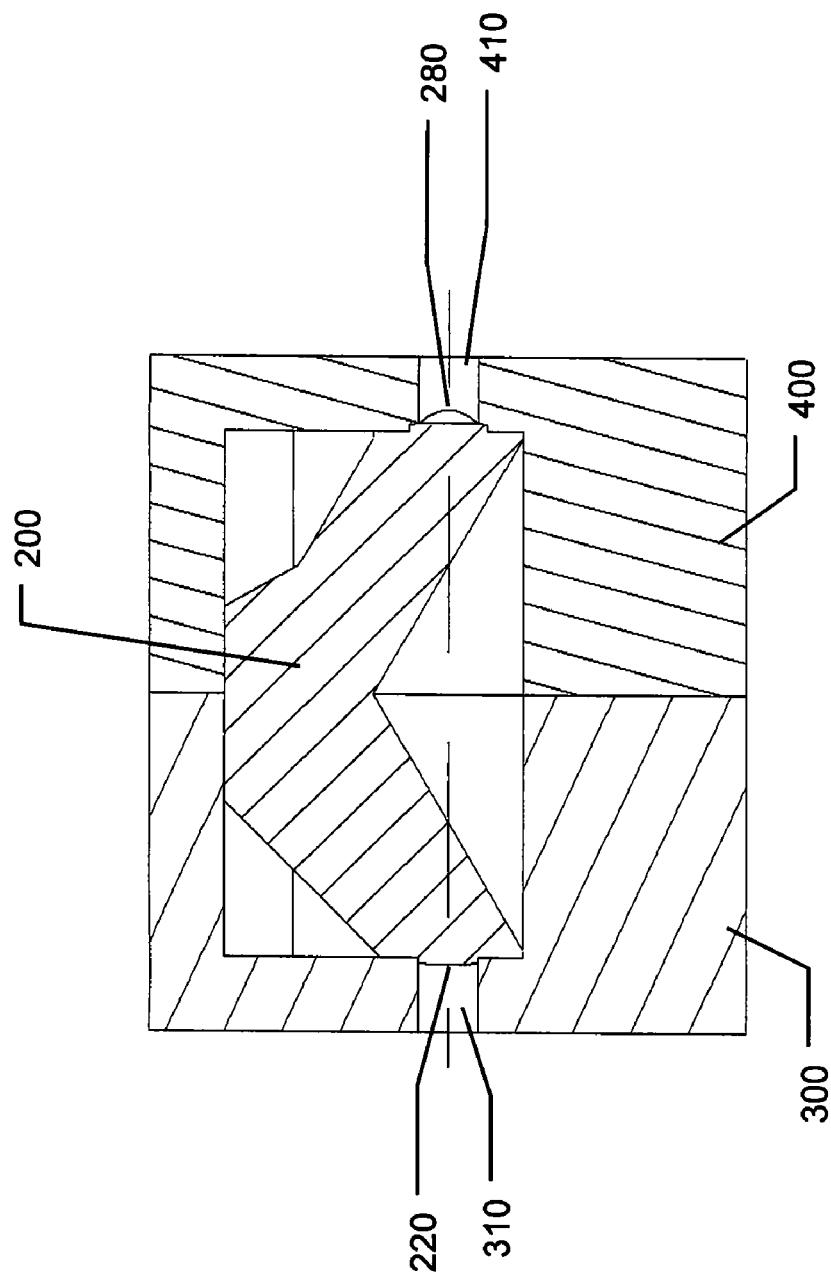
FIG. 4 is a cross-sectional side view drawing illustrating an Abbe prism lens assembly according to an embodiment of the present invention.
Figure 5A:
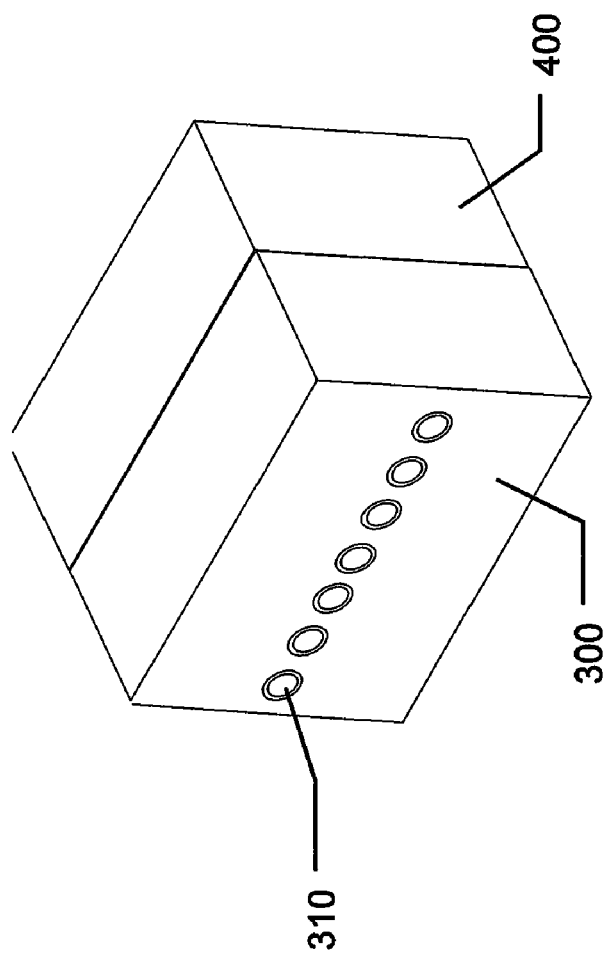
FIG. 5A is an assembled view drawing illustrating an Abbe prism lens assembly according to an embodiment of the present invention.
Figure 5B:
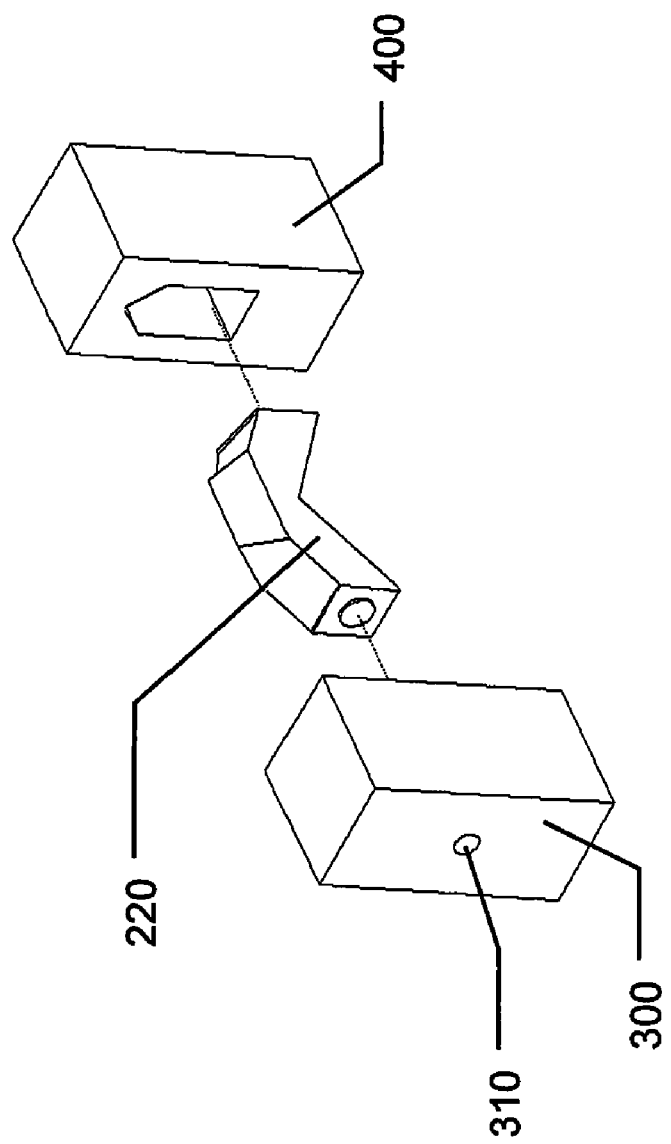
FIG. 5B is an exploded view drawing illustrating an Abbe prism single lenslet assembly according to an embodiment of the present invention.
Figure 6C:
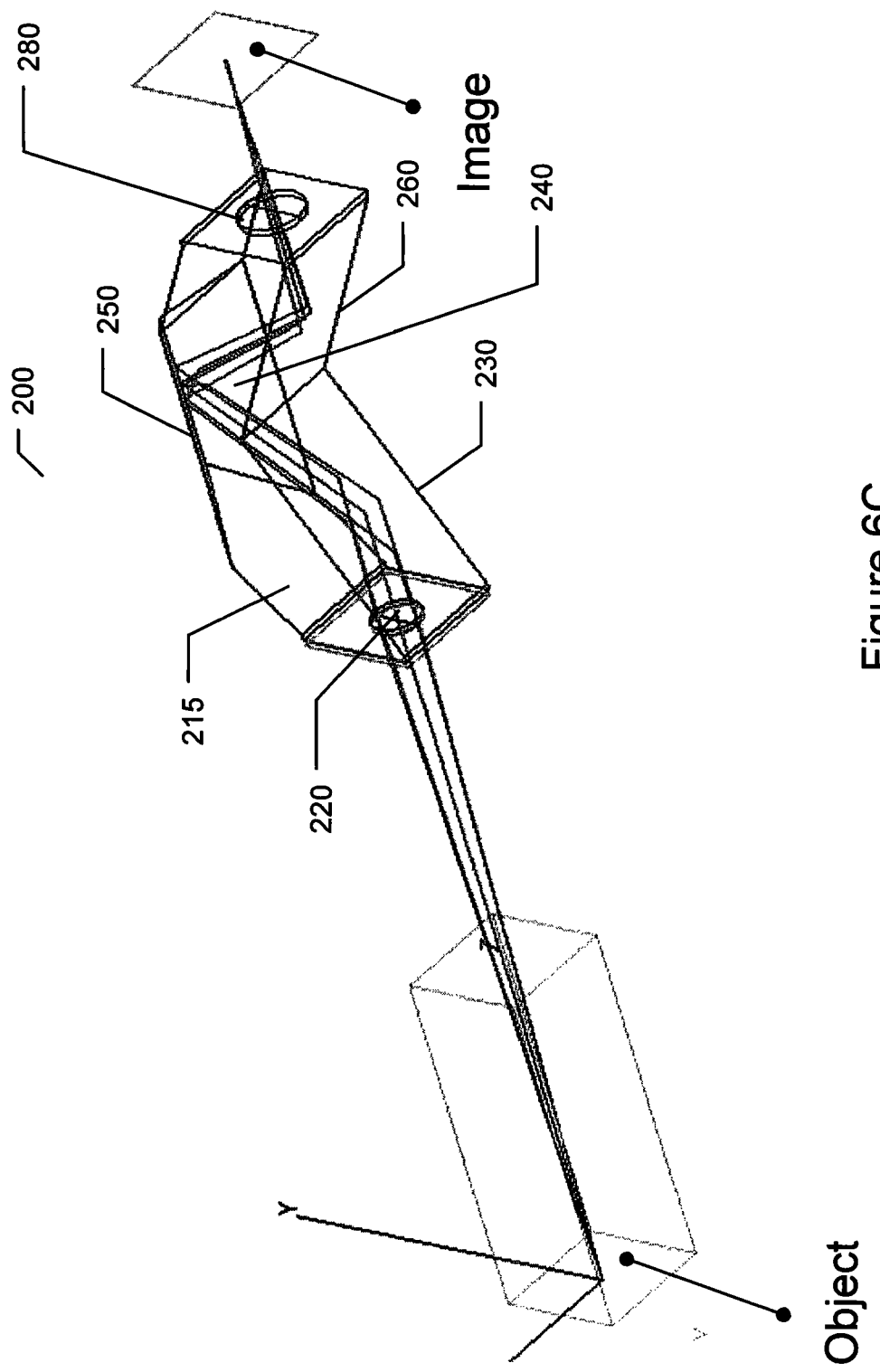
Figure 6D:
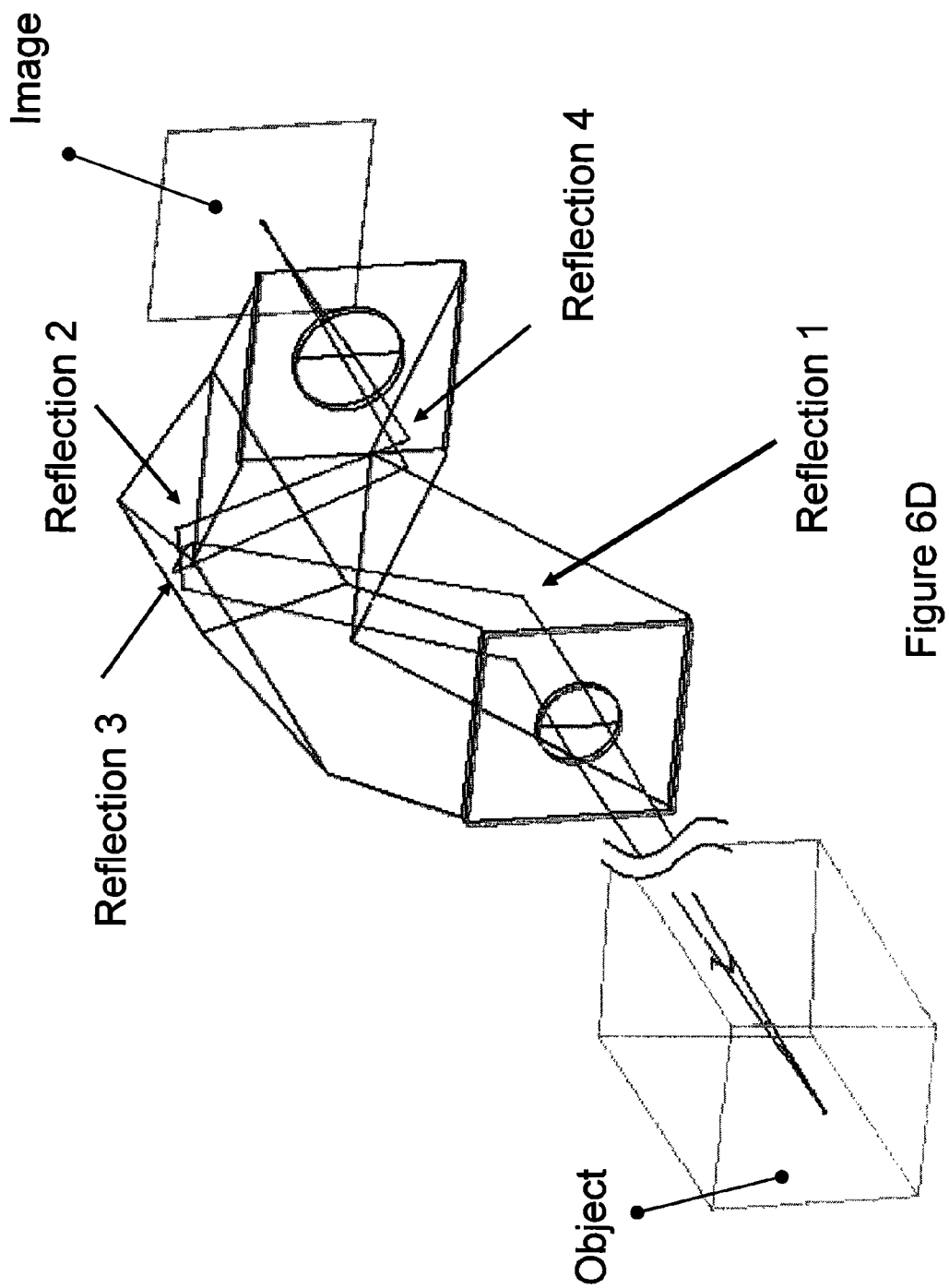

Refer to FIG. 4, which is a cross-sectional side view drawing illustrating an Abbe prism lens assembly according to an embodiment of the present invention, to FIG. 5A, which is an assembled view drawing illustrating an Abbe prism lens assembly according to an embodiment of the present invention, and to FIG. 5B, which is an exploded view drawing illustrating an Abbe prism lens assembly according to an embodiment of the present invention.

In the embodiment illustrated in FIGS. 4, 5A, and 5B the present invention provides an Abbe prism lens assembly 700 which further comprises an aperture cover 300 positioned over the front surface 210 of the Abbe prism lens 200 and a field cover 400 positioned over the rear surface 270 of the Abbe prism lens 200. The aperture cover 300 comprises an aperture hole 310 encircling the aspherical front lens 220. The field cover 400 comprises a field hole 410 encircling the aspherical rear lens 280.

Refer to FIGS. 6A-6D which are drawings illustrating light paths through an Abbe prism lens according to an embodiment of the present invention.

As shown in FIGS. 6A-6D an object such as a document is placed on a transparent surface 600 such as a glass platen of a flatbed scanner. Light is reflected off the object and enters the aspherical front lens 220 of the Abbe prism lens 200. This light then reflects off the front bottom reflecting surface 230, reflects off the left top reflecting surface 250 and the right top reflecting surface 240, reflects off the rear bottom reflecting surface 260, and exits the aspherical rear lens 280 of the Abbe prism lens.

After the light reflects off the front bottom reflecting surface 230 a portion of the light takes a path that reflects firstly off the left top reflecting surface 250 and then secondly off the right top reflecting surface 240 before reflecting off the rear bottom reflecting surface 260. The other portion of the light takes a path that reflects firstly off the right top reflecting surface 240 and then secondly off the left top reflecting surface 250 before reflecting off the rear bottom reflecting surface 260.

Light entering the Abbe prism lens of the present invention is reflected a total of four times before exiting. As a result, the corresponding image of the object is in up-right orientation and not upside-down.

Figure 7A:
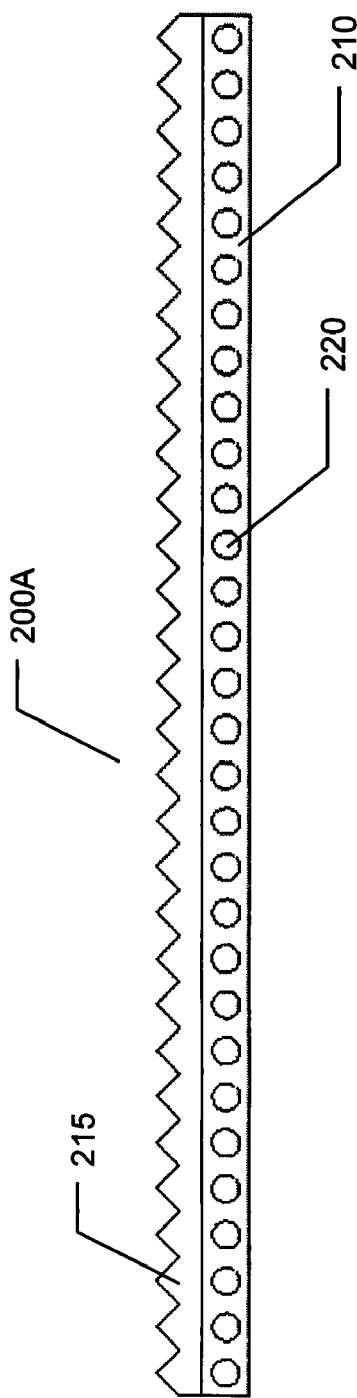
FIG. 7A is a front view drawing illustrating an Abbe prism lens array according to an embodiment of the present invention.
Figure 7B:
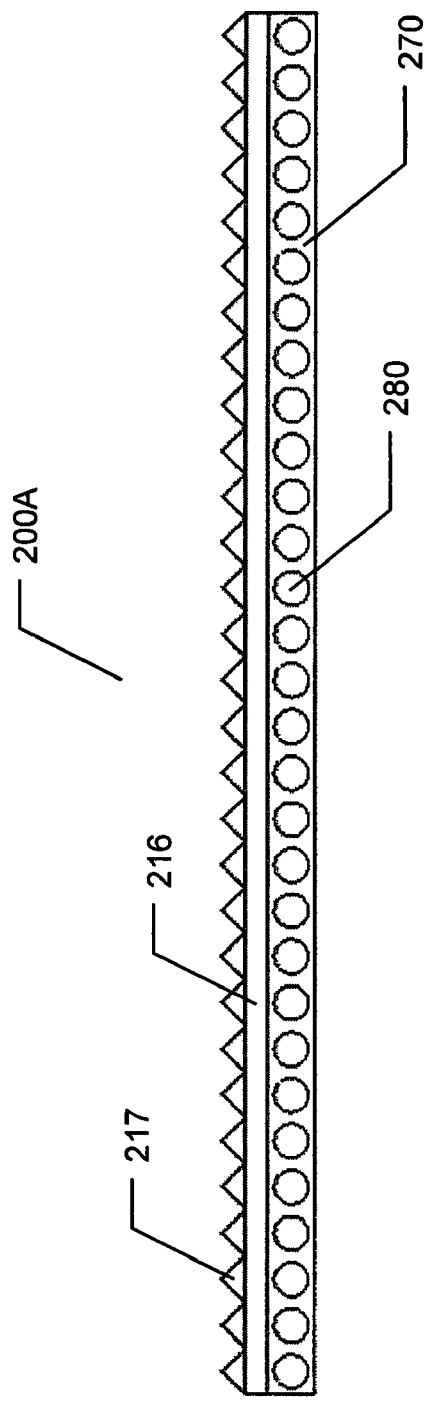
FIG. 7B is a rear view drawing illustrating an Abbe prism lens array according to an embodiment of the present invention.
Figure 7E:
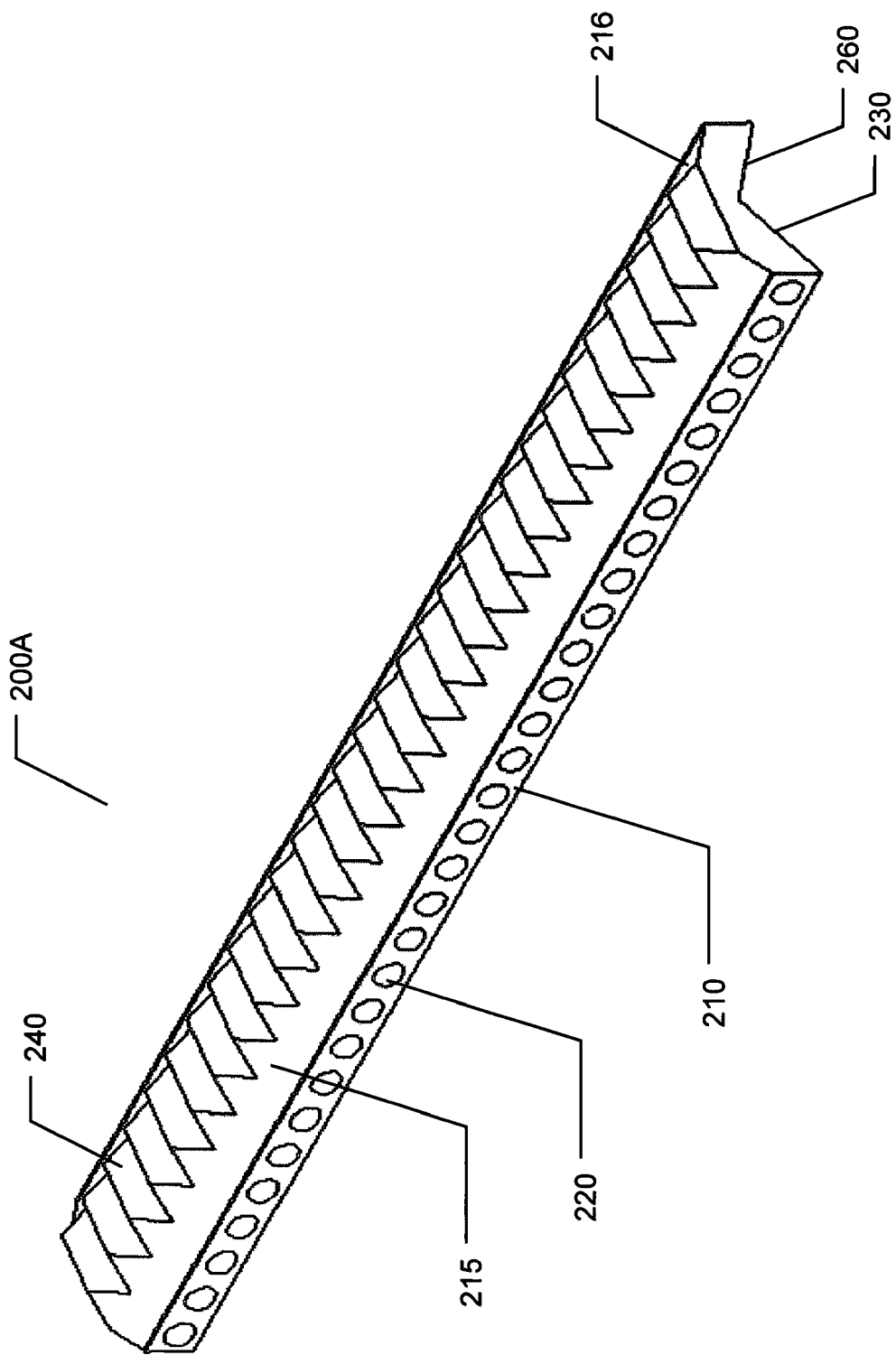
FIG. 7E is a perspective view drawing illustrating an Abbe prism lens array according to an embodiment of the present invention.

Refer to FIG. 7A, which is a front view drawing illustrating an Abbe prism lens array according to an embodiment of the present invention, to FIG. 7B, which is a rear view drawing illustrating an Abbe prism lens array according to an embodiment of the present invention, to FIG. 7C, which is a top view drawing illustrating an Abbe prism lens array according to an embodiment of the present invention, to FIG. 7D, which is a bottom view drawing illustrating an Abbe prism lens array according to an embodiment of the present invention, and to FIG. 7E which is a perspective view drawing illustrating an Abbe prism lens array according to an embodiment of the present invention.

In the embodiment illustrated in FIGS. 7A-7E the present invention comprises a plurality of Abbe prism lenses connect together to form an Abbe prism lens array 200A. The Abbe prism lens array 200A is formed by, for example, injection molding of transparent material. Utilizing the Abbe prism lens array 200A allows for reproducing or capturing a greater linear area of an image.

Figure 8A:
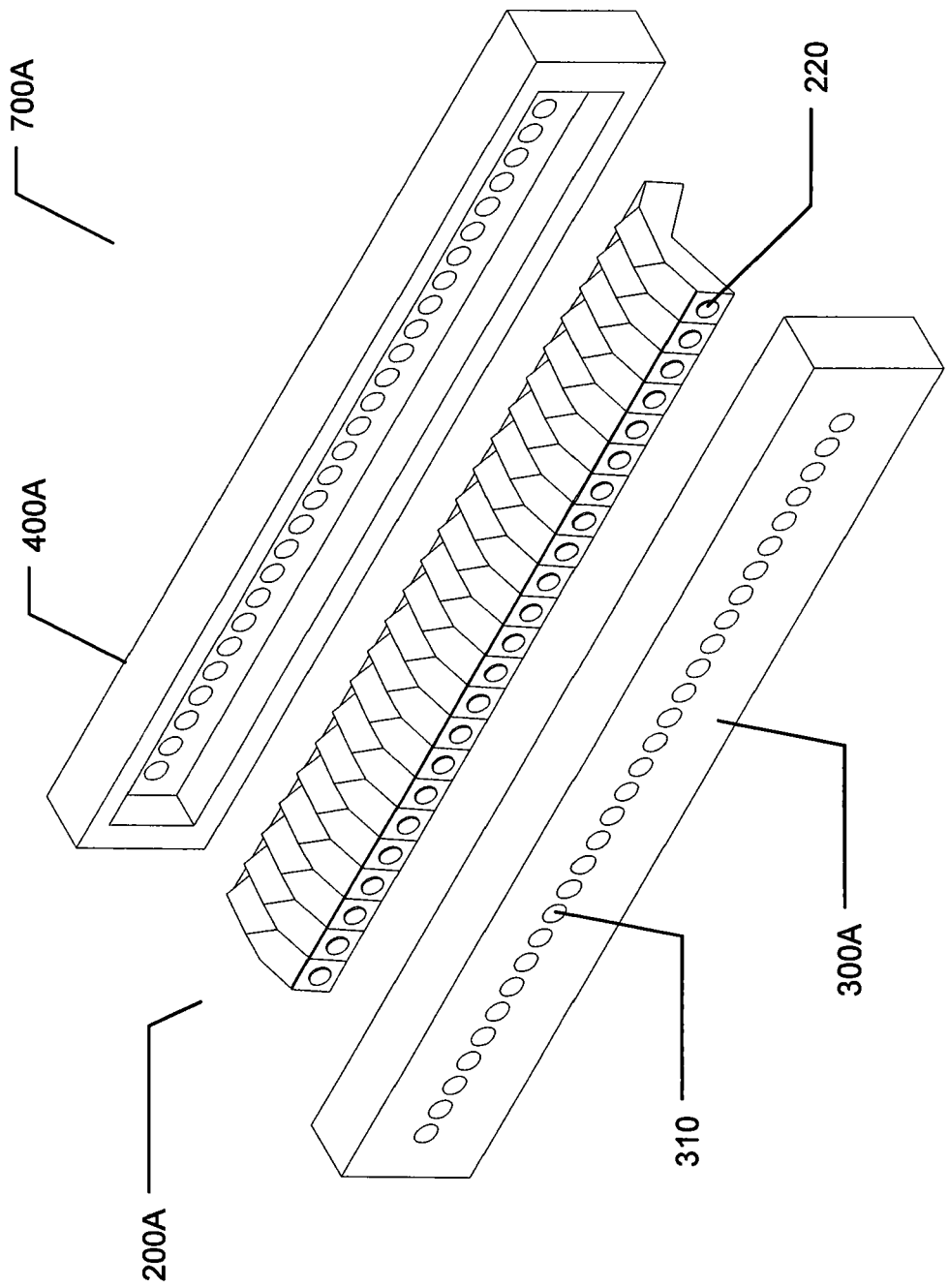
FIG. 8A is an exploded view drawing illustrating an Abbe prism lens array assembly according to an embodiment of the present invention.
Figure 8B:
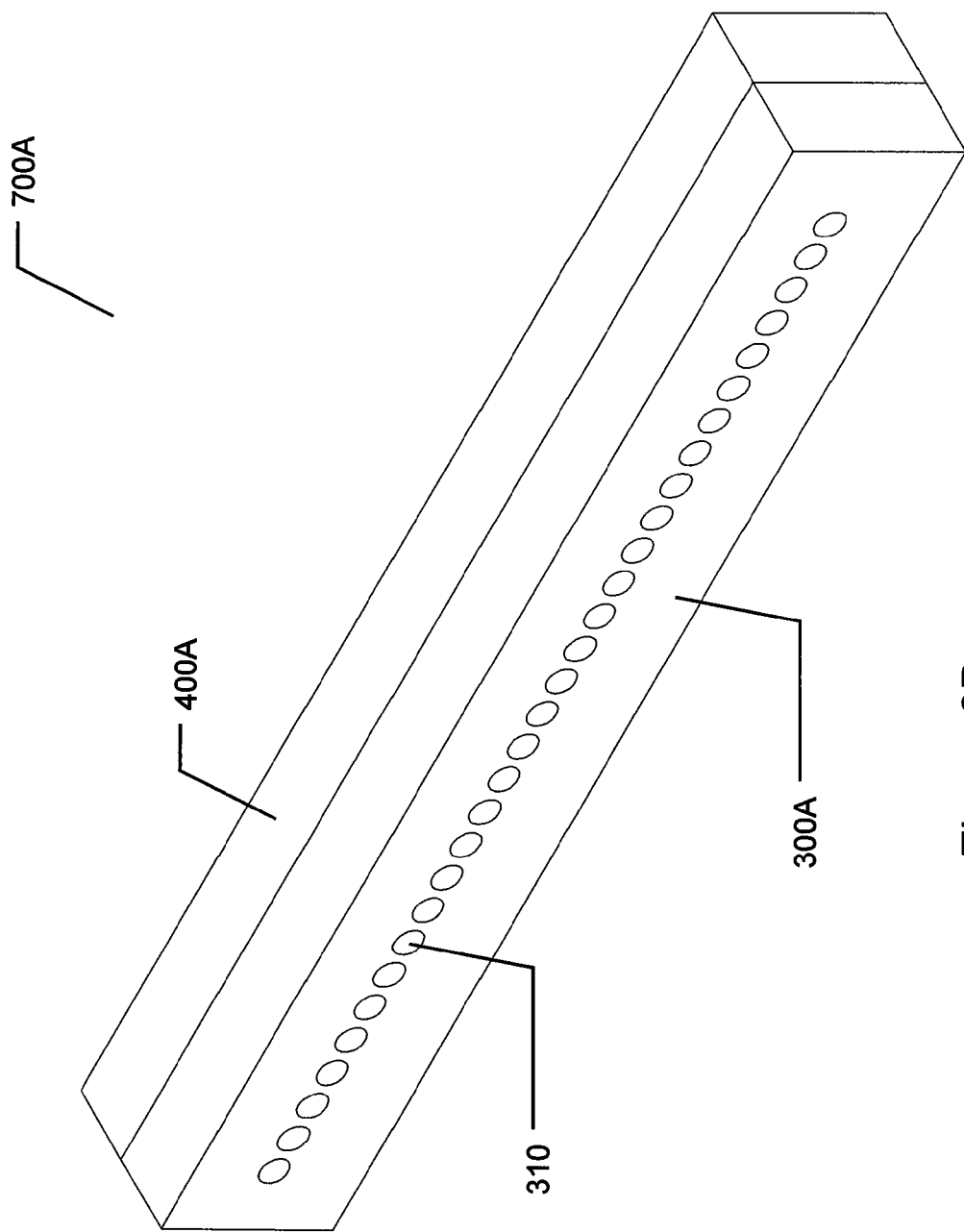
FIG. 8B is an assembled view drawing illustrating an Abbe prism lens array assembly according to an embodiment of the present invention.

Refer to FIG. 8A, which is an exploded view drawing illustrating an Abbe prism lens array assembly according to an embodiment of the present invention and to FIG. 8B, which is an assembled view drawing illustrating an Abbe prism lens array assembly according to an embodiment of the present invention.

In the embodiment illustrated in FIGS. 8A and 8B the present invention provides an Abbe prism lens array assembly 700A which further comprises an aperture cover 300A positioned over the front surface 210 of the Abbe prism lens array 200A and a field cover 400A positioned over the rear surface 270 of the Abbe prism lens array 200A. The aperture cover 300A comprises a plurality of aperture cover holes 310 encircling the aspherical front lenses 220. The field cover 400A comprises a plurality of field holes 410A encircling the aspherical rear lenses.

Figure 9A:
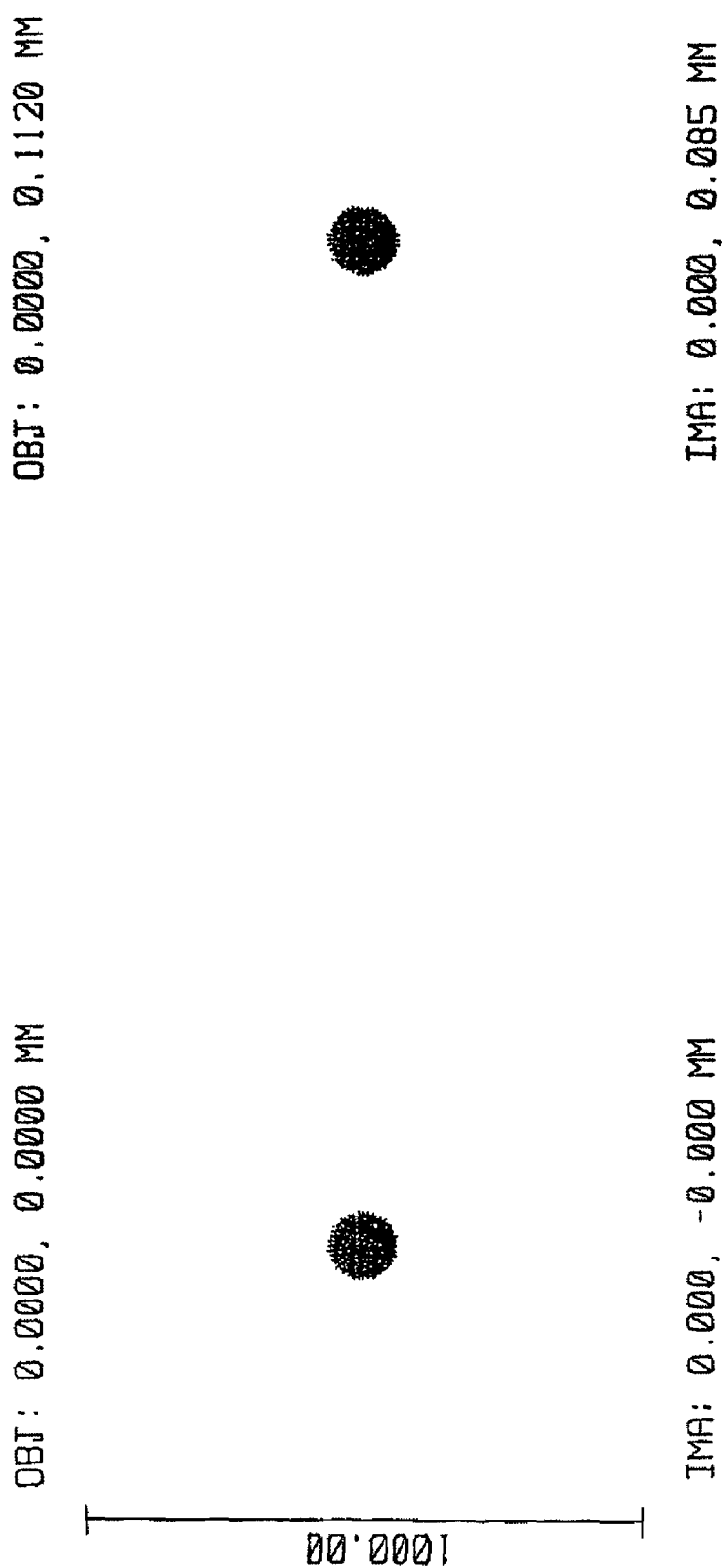
FIG. 9A is a drawing illustrating a lens simulation for the Abbe prism lens array according to an embodiment of the present invention.

Refer to FIG. 9A, which is a drawing illustrating a lens simulation for the Abbe prism lens array according to an embodiment of the present invention and to FIG. 9B, which is a drawing illustrating a lens simulation for a convention lens array of the prior art.

FIGS. 9A and 9B show a spot size comparison between the Abbe prism lens array of the present invention and a conventional lens array when an image is positioned 1 mm away from the optimal focal point. On the left hand side of FIG. 9A the spot size is 36.11 μm and on the right hand side the spot size is 36.23 μm. On the left hand side of FIG. 9B the spot size is 121 μm and on the right hand side the spot size is 127 μm.

By comparing the two results it is easily seen that the Abbe prism lens array of the present invention provides an improved image quality when an image is not positioned in the optimal position for best focus. For example, if a document is warped and portions of the document don't contact the platen glass, the Abbe prism lens array will still allow for a high quality image capture. The Abbe prism lens array of the present invention is more tolerant or forgiving when compared to the conventional lens array. With the conventional lens array any portions of a document or object that are positioned outside the optimal focal point are reproduced poorly. Devices utilizing the Abbe prism lens array of the present invention offer superior quality image reproduction or capture and have a higher focal point tolerance.

Figure 10A:
FIG. 10A is a drawing illustrating a lens simulation for the Abbe prism lens array according to an embodiment of the present invention.

Refer to FIG. 10A, which is a drawing illustrating a lens simulation for the Abbe prism lens array according to an embodiment of the present invention and to FIG. 10B, which is a drawing illustrating a lens simulation for a conventional lens array of the prior art.

Again with a defocus of 1 mm the image comparison between the Abbe prism lens array of the present invention and the conventional lens array clearly shows that the resultant image is far more focused and superior for the Abbe prism lens array.

Since the Abbe prism lens and Abbe prism lens array are formed in one piece injection-molding, issues associated with assembly stack-up tolerances are minimized.

By altering the thickness of the front of the aperture cover, flair can be reduced. In other words, by increasing or decreasing the length of the aperture hole (increasing or decreasing the thickness between the front face of the aperture cover and the rear face of the aperture cover) flair can be reduced.

Additionally, by altering the diameter of the aperture hole image intensity can be controlled.

By altering the diameter of the field cover hole, flare can be reduced and linear image range or size of captured image is controlled.

In an embodiment of the present the diameter of the aperture cover hole and the diameter of the field cover hole are different. In an embodiment of the present the diameter of the aperture cover hole and the diameter of the field cover hole are the same.

In an embodiment of the present the curvature of the front lens and the curvature of the rear lens are different. In an embodiment of the present the curvature of the front lens and the curvature of the rear lens are the same.

In some embodiments of the present invention the aperture cover and the field cover have a plurality of holes organized such that the centers of the holes form a line down the center of the cover. The plurality of holes are spaced apart equally by the inter-axis distance. The plurality of holes are circular, oval, cylindrical, or conical.

In some embodiments of the present invention the aperture cover and the field cover are made of 1 piece, 2 pieces, 3 pieces, or more pieces. For example, in an embodiment the one piece aperture cover is made of semi-flexible material and clamps over the Abbe prism lens or Abbe prism lens array. While the embodiments illustrated in the figures the aperture cover and the field cover are shown covering the front and rear of the Abbe prism lens, in other embodiments the aperture cover and the field cover cover the top and bottom or other orientations. In these embodiments the aperture cover and the field cover still provide aperture holes and field holes encircling the front and rear lenses.

In embodiments of the present invention the aperture cover and the field cover further comprise mating elements to attach and hold the lens assembly together. For example, along the edges of the field cover a plurality of notches is positioned to mate with a plurality of ears on the aperture cover.

When the lens array assembly is used in an image scanner, it is very important that image light does not pass from one lens into another lens that is not perpendicular to it. When this light progresses into an adjacent lens, the resultant image that the sensor captures is a ghost image of the adjacent lens. This is called cross-talk and is undesirable.

An advantage of the present invention is that due to the wall thickness of the aperture cover and the field cover and the aperture and field holes extend to the edges of the individual lenses, cross-talk is prevented.

The dots per inch (DPI) resolution of the lens array is adjustable at design time by changing the optical radii, conic constant, or aspherical coefficients of the lenses. In contrast with the prior art rod lenses, the lens array can be designed to magnify the surface being imaged.

The lens array of the present invention provides a substantial improvement over the prior art by reducing manufacturing complexity and materials costs. Furthermore, the lens array makes it substantially less difficult to increase the resolution of a device using the lens array compared to the prior art.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A lens comprising:
    an Abbe prism, the Abbe prism comprising an aspherical front lens disposed on a front surface of the Abbe prism and an aspherical rear lens disposed on a rear surface of the Abbe prism; and
    a field cover on the rear surface of the Abbe prism, the field cover comprising a field hole encircling the aspherical rear lens.

2. A lens comprising:
    an Abbe prism, the Abbe prism comprising an aspherical front lens disposed on a front surface of the Abbe prism and an aspherical rear lens disposed on a rear surface of the Abbe prism; and
    a field cover over the rear surface of the Abbe prism, the field cover comprising a field hole for allowing light to exit the aspherical rear lens.

3. A lens array comprising:
    a plurality of Abbe prisms, each Abbe prism comprising an aspherical front lens disposed on a front surface of the Abbe prism and an aspherical rear lens disposed on a rear surface of the Abbe prism; and
    a field cover positioned on the rear surface of the plurality of Abbe prisms, the field cover comprising a plurality of field holes encircling the aspherical rear lenses.

4. A lens array comprising:
    a plurality of Abbe prisms, each Abbe prism comprising:
        an aspherical front lens disposed on a front surface of the Abbe prism;
        an aspherical rear lens disposed on a rear surface of the Abbe prism;
        a front bottom reflecting surface;
        a rear bottom reflecting surface, the front bottom reflecting surface positioned between the front surface and the rear bottom reflecting surface and the rear bottom reflecting surface positioned between the front bottom reflecting surface and the rear surface;
        a left top reflecting surface; and
        a right top reflecting surface adjoining the left top reflecting surface;
        a front slope surface positioned between the left top reflecting surface and the right top reflecting surface and the front surface; and
        a rear slope surface positioned between the left top reflecting surface and the right top reflecting surface and the rear surface;
        wherein light enters the aspherical front lens of the Abbe prism, reflects off the front bottom reflecting surface, reflects off the left top reflecting surface and the right top reflecting surface, reflects off the rear bottom reflecting surface, and exits the aspherical rear lens of the Abbe prism;
    an aperture cover positioned on the front surface of the Abbe prisms, the aperture cover comprising a plurality of aperture holes encircling the aspherical front lenses; and
    a field cover positioned on the rear surface of the Abbe prisms, the field cover comprising a plurality of field holes encircling the aspherical rear lenses.

5. The lens array of claim 4, the rear slope surface comprising:
    an upper rear slope surface; and
    a lower rear slope surface.

6. The lens array of claim 4, where the angle between the front bottom reflecting surface and the rear bottom reflecting surface is between 1 and 179 degrees.

7. The lens array of claim 4, where the angle between the left top reflecting surface and the right top reflecting surface is between 1 and 90 degrees.

8. The lens array of claim 4, where the plurality of Abbe prisms are formed as one piece of transparent polymer.

* * * * *